(12) United States Patent
König et al.

(10) Patent No.: US 11,045,977 B2
(45) Date of Patent: Jun. 29, 2021

(54) DEVICE AND METHOD FOR DISPERSING SOLIDS, LIQUIDS AND GASES IN AN EXTRUDER

(71) Applicant: Covestro Deutschland AG, Leverkusen (DE)

(72) Inventors: Thomas König, Leverkusen (DE); Michael Bierdel, Leverkusen (DE)

(73) Assignee: Covestro Deutschland AG, Leverkusen (DE)

( * ) Notice: Subject to any disclaimer, the term of this patent is extended or adjusted under 35 U.S.C. 154(b) by 145 days.

(21) Appl. No.: 15/781,295

(22) PCT Filed: Dec. 14, 2016

(86) PCT No.: PCT/EP2016/080926
§ 371 (c)(1),
(2) Date: Jun. 4, 2018

(87) PCT Pub. No.: WO2017/102808
PCT Pub. Date: Jun. 22, 2017

(65) Prior Publication Data
US 2018/0354159 A1    Dec. 13, 2018

(30) Foreign Application Priority Data
Dec. 16, 2015    (EP) .................................... 15200372

(51) Int. Cl.
*B29C 48/56*    (2019.01)
*B29B 7/40*    (2006.01)
(Continued)

(52) U.S. Cl.
CPC .............. *B29B 7/402* (2013.01); *B29B 7/421* (2013.01); *B29B 7/483* (2013.01); *B29B 7/485* (2013.01);
(Continued)

(58) Field of Classification Search
CPC ...................................................... B29C 48/565
(Continued)

(56) References Cited

U.S. PATENT DOCUMENTS 2,813,302 A * 11/1957 Beck ...................... B29C 48/575
264/349
4,408,887 A * 10/1983 Yamaoka ................ B29B 7/421
366/75
(Continued)

FOREIGN PATENT DOCUMENTS

DE    3216939 C2    5/1986
DE    69203055 T2    12/1995
(Continued)

OTHER PUBLICATIONS

International Search Report for PCT/EP2016/080926 dated Mar. 3, 2017. (English translation attached).
Written Opinion of the International Searching Authority for PCT/EP2016/080926 dated Mar. 3, 2017.

*Primary Examiner* — David L Sorkin
(74) *Attorney, Agent, or Firm* — K&L Gates LLP

(57) ABSTRACT

Device and method for dispersing solids, liquids and gases in an extruder, having at least one shaft (1) and one housing (2), wherein at least one disk (4) with recesses is attached to the shaft, which at least one disk co-rotates with the shaft, and a non-co-rotating disk (3) is arranged immediately adjacent to the disk either in a product flow direction or counter to the product flow direction, which non-co-rotating disk likewise has recesses, and wherein the co-rotating disk is connected to the rotating shaft and has a gap (14) with respect to the housing, and the non-co-rotating disk is connected to the housing and has a gap (15) with respect to the rotating core shaft.

11 Claims, 4 Drawing Sheets

(51) Int. Cl.
  *B29C 48/565* (2019.01)
  *B29C 48/575* (2019.01)
  *B29C 48/685* (2019.01)
  *B29B 7/42* (2006.01)
  *B29B 7/48* (2006.01)
  *B29B 7/88* (2006.01)
  *B29C 48/385* (2019.01)
  *B29C 48/41* (2019.01)
  *B29C 48/435* (2019.01)
  *B29C 48/43* (2019.01)

(52) U.S. Cl.
  CPC ............... *B29B 7/88* (2013.01); *B29C 48/385* (2019.02); *B29C 48/41* (2019.02); *B29C 48/565* (2019.02); *B29C 48/575* (2019.02); *B29C 48/686* (2019.02); *B29C 48/687* (2019.02); *B29C 48/43* (2019.02); *B29C 48/435* (2019.02)

(58) Field of Classification Search
  USPC .................................................... 366/81, 82
  See application file for complete search history.

(56) References Cited

U.S. PATENT DOCUMENTS

| | | | | |
|---|---|---|---|---|
| 5,320,796 A | * | 6/1994 | Harashima | B29B 7/402 264/349 |
| 5,370,456 A | * | 12/1994 | Yamaoka | B29C 48/397 366/80 |
| 5,589,203 A | * | 12/1996 | Sato | B29C 48/92 425/147 |
| 6,013,701 A | * | 1/2000 | Kunimatsu | C08L 83/04 523/351 |
| 6,017,996 A | * | 1/2000 | Hamada | B29B 7/90 524/588 |

FOREIGN PATENT DOCUMENTS

| | | |
|---|---|---|
| DE | 69205105 T2 | 4/1996 |
| DE | 69313513 T2 | 1/1998 |
| DE | 69810869 T2 | 11/2003 |
| EP | 0902057 A2 | 3/1999 |
| JP | 2006/321821 | 11/2006 |

* cited by examiner

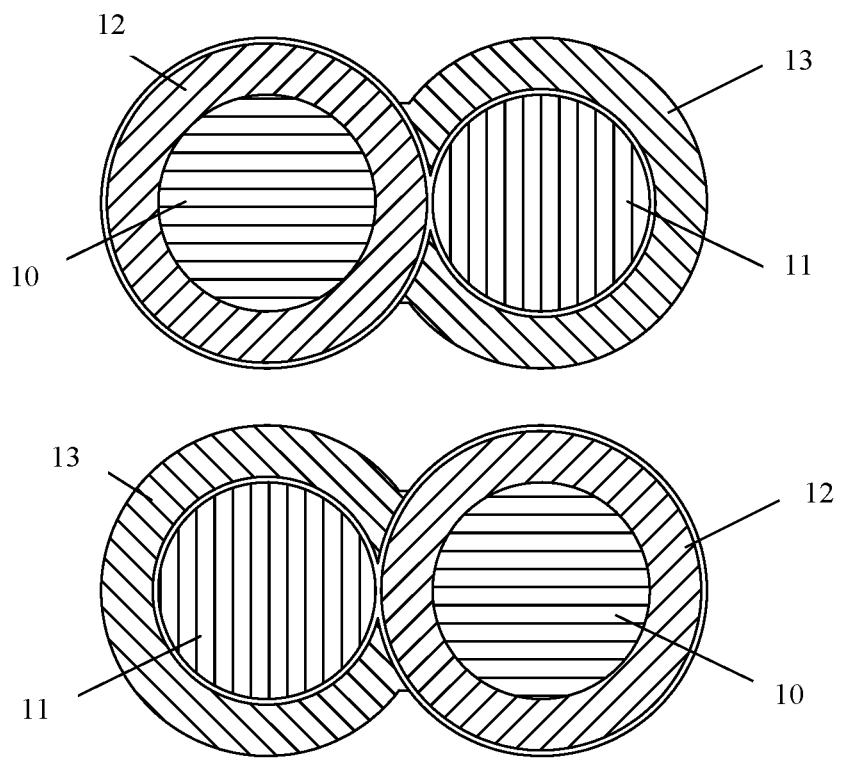
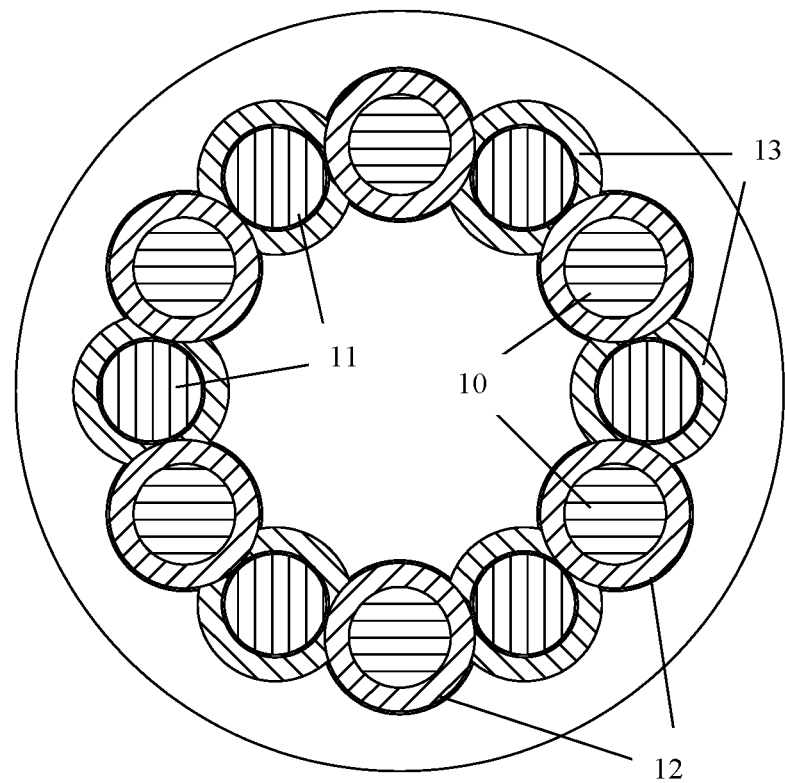
Fig. 3
Fig. 4

DEVICE AND METHOD FOR DISPERSING SOLIDS, LIQUIDS AND GASES IN AN EXTRUDER

The invention relates to a device comprising an extruder which has (a) shaft(s) on which there is at least one plate attached which rotates concomitantly and which has interruptions, and where, arranged directly following the plate that rotates concomitantly, there is a plate which does not rotate concomitantly, which likewise has interruptions. The device is suitable for the dispersion of solids, liquids and gases, and exhibits improved dispersion effect. The invention further relates to a process for the dispersion of solids, liquids and/or gases in plastic compositions.

There are known to be various types of extruders. The extruders most frequently used, because of their simple construction, are single-screw extruders (for which the synonym single-shaft extruders is also used), where a single shaft rotates in a barrel. Multiscrew extruders (for which the synonym multishaft extruders is also used) are another type, with a plurality of rotating shafts. Corotating and contrarotating extruder shafts, and also combinations thereof, can be used here.

The dispersion of solids, liquids or gases in a plastic composition with the aid of an extruder is a task that frequently arises in the processing of polymers.

As is known to the person skilled in the art, inadequate dispersion has disadvantages. If solids are not well dispersed, results can be increased costs due to increased consumption of material, and impairment of mechanical properties, due by way of example to specks of undispersed material. Poorly dispersed liquids are by way of example inadequately distributed or, in the case of soluble liquids, are still present in free form after the dispersion procedure. Inadequately distributed liquids lead to nonuniform distribution of product properties, and can thus impair service properties if by way of example a portion of a polymer has a high concentration of additive and another proportion has a low concentration. If a portion of a liquid is still present in free form at the head of an extruder, it is then possible that by way of example an organic liquid escapes, for example, from the bearings of a gear pump or is released under pressure at high temperatures from the die. This can lead to soiling problems, injuries due to the hot liquid, environmental problems due to evaporation of the liquid, or even to fires if a finely divided organic liquid ignites in the atmosphere.

Possible results of poor gas dispersion depend on the aim of the process, an example being nonuniform foam in the production of insulation materials, or inadequate degassing.

Every dispersion process in an extruder simultaneously involves energy input. Increased energy input generally leads to thermal or other product degradation, which is undesirable. An important technical object is therefore improved dispersion effect for the same energy input or, conversely, reduced energy input for the same dispersion effect.

The object arising from the prior art is therefore to provide a device comprising an extruder with an improved dispersion effect and/or with reduced energy input.

Said object has been achieved via the provision of the device of the invention comprising an extruder which has (a) shaft(s) on which there is at least one plate attached which rotates concomitantly with the shaft and which has interruptions, and where, arranged directly following said plate either in the direction of product flow or in the direction offset to product flow, there is a plate which does not rotate concomitantly with the shaft, which likewise has interruptions.

Surprisingly, it has been found that the device of the invention provides improved dispersion for the same energy input. Insofar as improved dispersion is not required or is not required to the extent available, energy input can be reduced.

The use of the device of the invention therefore permits improvement of the product quality of the plastic composition via improved homogenization and/or reduced energy input.

In the invention there is, attached on the shaft(s) of the extruder, at least one plate with interruptions which rotates concomitantly with the shaft, and directly following which, either in product-flow direction or in the direction opposite to product flow, the arrangement has a plate which does not rotate concomitantly, which likewise has interruptions. The concomitantly rotating plate here is bonded to the rotating shaft and exhibits a gap in the direction of the barrel, and the plate which does not rotate concomitantly is bonded to the barrel and exhibits a gap in the direction of the rotating root shaft.

Preference is given to an arrangement of a plurality of combinations of such plates in succession, in order to increase the dispersion effect; the extruder therefore has an alternating sequence of rotating plates and nonrotating plates.

BRIEF DESCRIPTION OF THE DRAWINGS

FIG. 3 shows by way of example a twin-shaft extruder;

FIG. 4 shows by way of example a twelve-shaft extruder;

DETAILED DESCRIPTION

Figure 1:
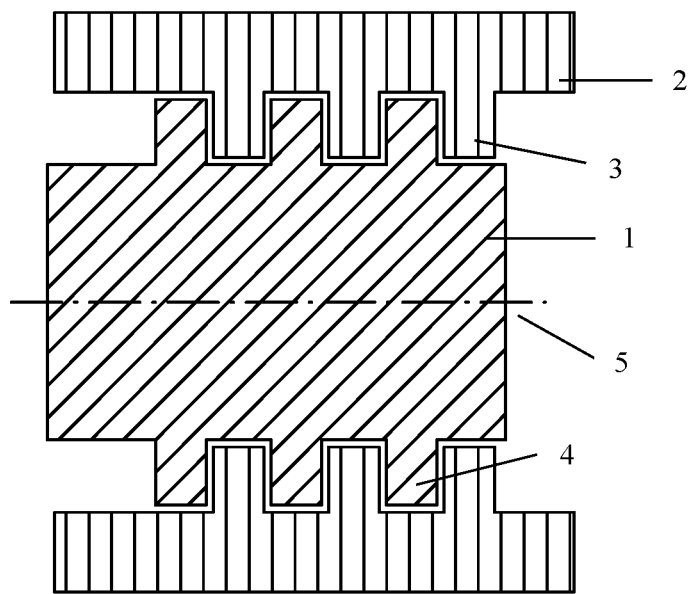
FIG. 1 shows by way of example a section through an extruder shaft (1) with the barrel (2) and with the plates (3) bonded thereto, and the shaft (1) and the plates (4) bonded there-to, and also the axis (5) of rotation.

FIG. 1 shows by way of example a section through an extruder shaft (1) with the barrel (2) and with the plates (3) bonded thereto, and the shaft (1) and the plates (4) bonded thereto, and also the axis (5) of rotation.

Figure 2:
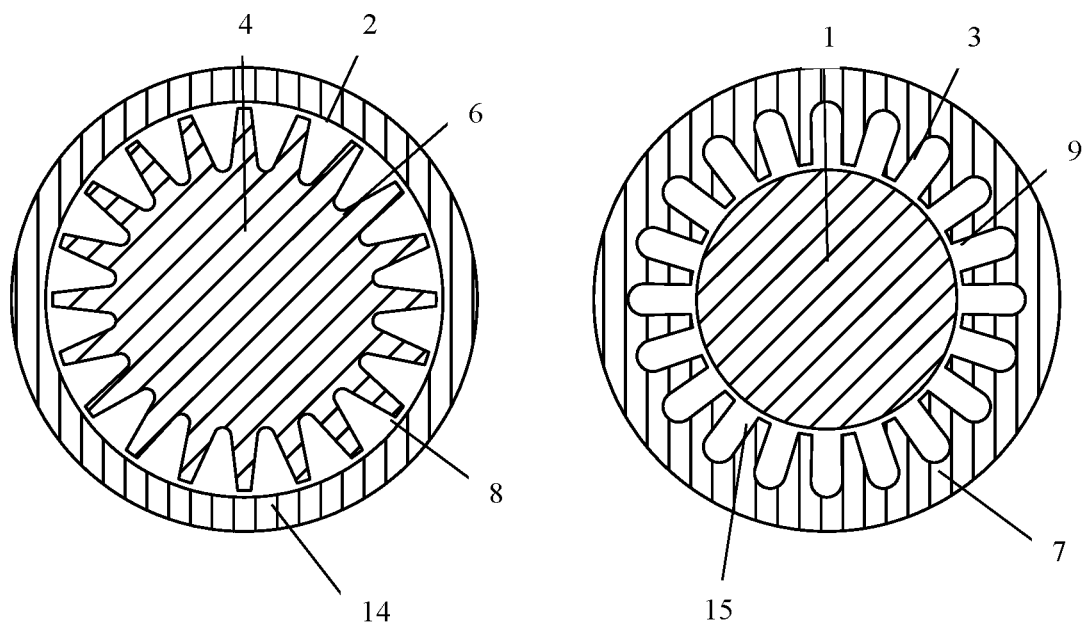
FIG. 2 shows by way of example grooves (6) of this type in a plate (4) which is bonded to the shaft (1) (left-hand side) and rotates concomitantly, and grooves (7) in a plate (3) which is bonded to the barrel (2) and does not rotate concomitantly.

In a preferred embodiment, the interruptions of the plate that rotates concomitantly continue as far as the periphery of the plate, i.e. the periphery of the plate that rotates concomitantly is interrupted. It is preferable that the interruptions are configured as grooves which can extend as far as the root diameter, but it is not essential that they do so. FIG. 2 shows by way of example grooves (6) of this type in a plate (4) which is bonded to the shaft (1) (left-hand side) and rotates concomitantly, and grooves (7) in a plate (3) which is bonded to the barrel (2) and does not rotate concomitantly. The parts that rotate with the shaft are in each case diagonally hatched; the nonmoving parts, with barrel (2), are vertically hatched. The grooves (6, 7) can be U-shaped or V-shaped.

Fillets (8, 9) separate the grooves (6, 7) from one another.

Figure 8:
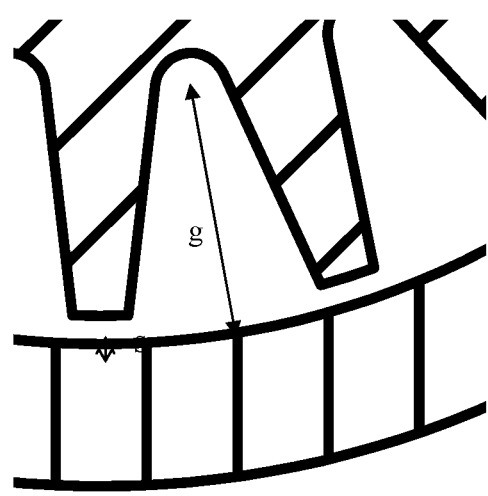
FIG. 8 shows a detail from FIG. 2.

The flight depth g is defined in the invention as the distance between the barrel and the root diameter of the shaft (see FIG. 8, which shows a detail from FIG. 2).

The clearance s between the periphery of the concomitantly rotating plate and the barrel must be smaller than g/2. s is preferably smaller than g/4 and particularly preferably smaller than g/8. The clearance s is greater than g/256, preferably greater than g/128 and particularly preferably greater than g/64.

The ratio of the thickness of the rotating plate(s) to the barrel diameter is preferably from 0.2 to 0.02, particularly preferably from 0.15 to 0.03 and very particularly preferably from 0.1 to 0.04.

The ratio of the thickness of the nonrotating plate(s) to the barrel diameter is preferably from 0.2 to 0.02, particularly preferably from 0.15 to 0.03 and very particularly preferably from 0.1 to 0.04.

The ratio of the axial gap between two plates to the barrel diameter is preferably from 0.01 to 0.15, particularly preferably from 0.02 to 0.1 and very particularly preferably from 0.03 to 0.08.

In a preferred variant for intermeshing multishaft extruders, where the screw shafts intermesh, attached on one shaft there is a concomitantly rotating plate with interruptions, and both the plate that does not rotate concomitantly and the concomitantly rotating plate, in each case ignoring the gaps, cover at least 70% of the free cross section between root diameter and external wall, preferably at least 80% and preferably at least 90%. This is shown by way of example for a twin-shaft extruder in FIG. 3 and for a twelve-shaft extruder in FIG. 4. In those drawings:

the root shafts (10) with which a plate rotates concomitantly are horizontally hatched the root shafts (11) with which no plate rotates concomitantly are vertically hatched the plates (12) that rotate concomitantly are hatched upward from left to right the plates (13) that do not rotate concomitantly are hatched upward from right to left.

Figure 7:
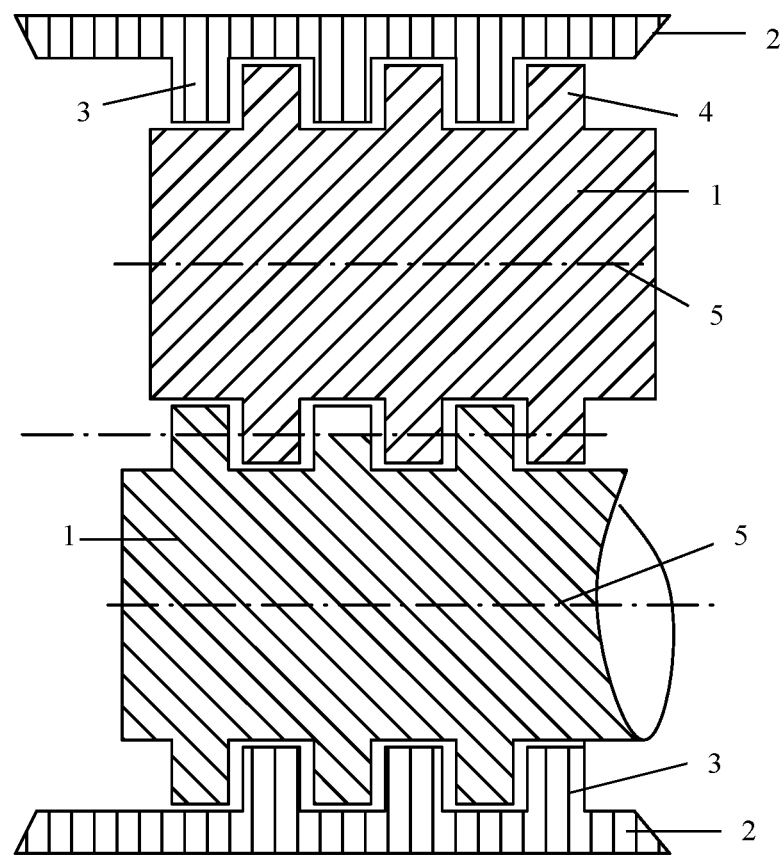
FIG. 7 shows, in section, by way of example the arrangement of the plates (4) that rotate concomitantly and plates (3) that do not rotate concomitantly in a twin-screw extruder.

FIG. 7 shows, in section, by way of example the arrangement of the plates (4) that rotate concomitantly and plates (3) that do not rotate concomitantly in a twin-screw extruder. The barrel (2) and the nonrotating plates (3) bonded thereto are vertically hatched here; each rotating screw (1), together with the plates (4) bonded thereto, is differently diagonally hatched.

When "the grooves" are mentioned hereinafter, this term means not only grooves (6) on a plate that rotates concomitantly but also grooves (7) on a fixed plate.

In a preferred embodiment, the interruptions of the rotating plate and the interruptions of the nonrotating plate are respectively configured as grooves. In a section perpendicular to the axis of rotation, the grooves can be arranged radially or obliquely. The base of the grooves preferably has rounded features in order to avoid notch stresses and corners not flushed by product.

Figure 5:
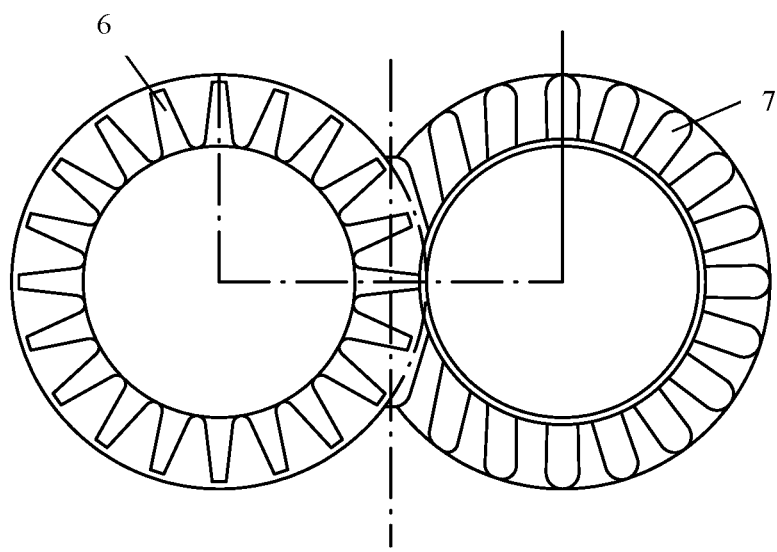
FIG. 5 shows by way of example the grooves (6) on the plate of the rotating shaft are arranged radially (perpendicularly in relation to the axis of rotation), and the grooves (7) on the plate that does not rotate concomitantly are arranged to some extent radially and to some extent obliquely relative to the axis of rotation, in order to contribute to the covering of the interstitial region.

In a preferred embodiment for multishaft extruders, the grooves (6) on the plate of the rotating shaft are arranged radially (perpendicularly in relation to the axis of rotation), and the grooves (7) on the plate that does not rotate concomitantly are arranged to some extent radially and to some extent obliquely relative to the axis of rotation, in order to contribute to the covering of the interstitial region, as shown in FIG. 5.

The edges of the grooves in projection perpendicularly to the direction of rotation are preferably parallel or open toward the gap (14) that remains between rotating plate (4) and barrel (2) and, respectively, fixed plate (3) and root shaft (1). They particularly preferably open toward the gap, as shown by way of example in FIG. 2.

Figure 6:
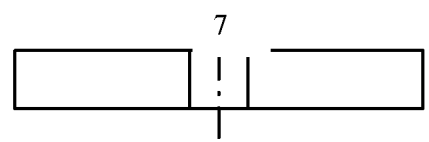
FIG. 6 shows by way of example that the grooves (7) can run perpendicularly in relation to the axis of rotation or at an angle thereto.
Figure 6:
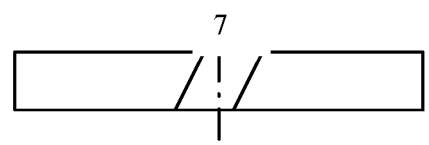
Figure 6:
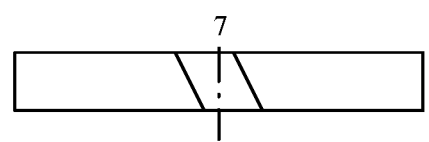

The grooves (7) can run perpendicularly in relation to the axis of rotation or at an angle thereto, as shown by way of example for a groove in FIG. 6. If the edges of the grooves are not arranged perpendicularly in relation to the axis of rotation, they preferably follow a helix. A preferred direction of conveying can be set by way of the pitch of the helix.

The number of the grooves (6, 7), distributed over the circumference of the rotating plate (4) and of the nonrotating plate (3), is preferably respectively from 4 to 60, particularly preferably respectively from 8 to 40 and very particularly preferably respectively from 12 to 30.

The fillets (8, 9) can have a rectangular cross section, or can have rounded-off corners, or they can have a round (circular, elliptical, or the like) cross section.

The present invention further provides a process for the extrusion of plastic compositions in a device of the invention.

The expression "plastic composition" means a deformable composition. Examples of plastic compositions are polymer melts, particularly of thermoplastics and elastomers, mixtures of polymer melts, and dispersions of polymer melts with solids, liquids or gases.

The process of the invention is used for the dispersion of gases, liquids or solids additives in the plastic composition.

An important class of plastic compositions is provided by polymers.

Various types of solids are used to provide a variety of properties to polymers. These can by way of example be mechanical strength, modulus of elasticity, electrical conductivity, toughness or color. Mechanical fillers can also provide assistance in the case of polymers in a process that consumes a large amount of energy and/or of other resources, in that the polymer is replaced to some extent by solids that consume less resources.

The solids are frequently present in agglomerated form, and have to be dispersed in order that they can be effective.

Solids can be present in particulate form, an example being calcium carbonate, talc powder or carbon black. Fibers can also be involved here, examples being bundles of glass fibers, which are intended to be separated from one another, and bundles made of carbon fibers, or reinforcement fibers made of polymers such as Kevlar.

Plastic compositions can also be composed of solids and liquids, e.g. pastes or doughs. In these cases, the incorporation of solids by mixing, or the dispersion of solids, serves by way of example to produce the paste or to modify the constitution thereof.

Dispersion of liquids in polymers can likewise serve various purposes. The liquids can by way of example be additives which provide particular properties to the polymer, examples being heat stabilizers, plasticizers, extender oils, UV stabilizers, oxygen scavengers, initiators for chemical reactions such as crosslinking or polymer degradation, catalysts, inhibitors for catalysts, vulcanization accelerators, flame retardants, compatibilizers acting between different polymer phases or between polymer and solid, or a process auxiliary, for example water for polymer degassing.

Dispersion of gases in polymers can likewise serve various purposes. It is an important step in the production of polymer foams of the type used by way of example for insulation. The dispersed gas can moreover likewise serve for the degassing of polymers.

The polymers can be thermoplastics, for example polycarbonates, polyamides, polyesters, in particular polybutylene terephthalate and polyethylene terephthalate, polyethers, thermoplastic polyurethanes, polyacetals, fluoropolymers, in particular polyvinylidene fluoride, polyether sulfones, polyolefins, in particular polyethylene and polypropylene, polyimides, polyacrylates, in particular poly(methyl)methacrylates, polyphenylene oxide, polyphenylene sulfides, polyether ketones, polyaryl ether ketones, styrene polymers, in particular polystyrene, styrene copolymers, in particular styrene-acrylonitrile copolymer, acrylonitrile-butadiene-styrene block copolymers and polyvinyl chloride. Use can also be made of what are known as blends made of the thermoplastics listed, where the term blend is understood by the person skilled in the art to mean a combination of two or more of the thermoplastics. The process of the invention is particularly preferably used in the production and compounding of polycarbonate.

Other preferred materials used are rubbers. Rubber used preferably comprises at least one from the group of styrene-butadiene rubber, natural rubber, butadiene rubber, isoprene rubber, ethylenepropylene-diene rubber, ethylene-propylene rubber, butadiene-acrylonitrile rubber, hydrogenated nitrile rubber, butyl rubber, halobutyl rubber, chloroprene rubber, ethylene-vinyl acetate rubber, polyurethane rubber, thermoplastic polyurethane, gutta-percha, acrylate rubber, fluoro rubber, silicone rubber, sulfide rubber, chlorosulfonylpolyethylene rubber. It is naturally also possible to use a combination of two or more of the rubbers listed, or a combination of one or more rubbers with one or more plastics.

These thermoplastics and elastomers can be used in pure form or in the form of mixtures with fillers and reinforcing materials, a particular example being glass fibers, or in the form of mixtures with one another or with other polymers, or in the form of mixtures with conventional polymer additives.

In a preferred embodiment of the process of the invention, additives are added to the plastic compositions, in particular the polymer melts and mixtures of polymer melts. These can take the form of solids, liquids or solutions added together with the polymer to the extruder, or else at least a portion of the additives or the entirety of the additives is introduced into the extruder by way of an ancillary stream.

Additives can provide a wide variety of properties to a polymer. They can by way of example be colorants, pigments, processing aids, fillers, antioxidants, reinforcing materials, UV absorbers and light stabilizers, metal deactivators, peroxide scavengers, basic stabilizers, nucleating agents, benzofurans and indolinones which are effective as stabilizers or antioxidants, or they can be mold-release agents, flame-retardant additives, antistatic agents, dyeing agents and melt stabilizers. By way of example, these are carbon black, glass fiber, clay, mica, graphite fiber, titanium dioxide, carbon fibers, carbon nanotubes, ionic liquids and natural fibers.

In another preferred embodiment of the process of the invention, the plastic compositions introduced into the extruder comprise monomers, oligomers and/or solvents which are at least to some extent removed by the process of the invention. In this embodiment, a gaseous entraining agent is dispersed in the plastic composition. The entraining agent is preferably in turn removed via application of vacuum in a subsequent step.

What is claimed is:

1. A device comprising an extruder with at least one shaft being rotatable and one barrel, the shaft comprising a root, the device comprising:
    attached on the shaft there is at least one plate with interruptions which rotates concomitantly with the shaft,
    and directly following the plate, either in product-flow direction or in the direction opposite to product flow, another plate is in place which does not rotate concomitantly, which likewise has interruptions;
    where the concomitantly rotating plate is bonded to the rotating shaft and exhibits a gap in the direction of the barrel, and the plate which does not rotate concomitantly is bonded to the barrel and exhibits a gap in the direction of the root of the rotating shaft,
    wherein the shaft comprises a flight and a flight depth;
    wherein the clearance s between the periphery of the concomitantly rotating plate and the barrel is smaller than the flight depth g divided by 4; where the flight depth g is the distance between the root diameter of the shaft and the barrel,
    and wherein the ratio of the thickness of the rotating plates to the barrel diameter is from 0.2 to 0.02, and the ratio of the thickness of the nonrotating plates to the barrel diameter is from 0.2 to 0.02,
    and wherein the ratio of the axial gap between the rotating plate(s) and the nonrotating plate(s) to the barrel diameter is from 0.01 to 0.15.

2. The device as claimed in claim 1, wherein the extruder has an alternating sequence of rotating plates and of the nonrotating plates.

3. The device as claimed in claim 1, wherein the interruptions in the rotating plate and in the nonrotating plate are respectively configured as grooves, where the grooves are arranged perpendicularly in relation to the axis of rotation or obliquely in relation to the axis of rotation.

4. The device as claimed in claim 3, wherein the grooves in the nonrotating plate are arranged helically.

5. The device as claimed in claim 3, wherein the number of the grooves in the rotating plate and the number of the grooves in the nonrotating plate is respectively from 4 to 60.

6. The device as claimed in claim 1, wherein the extruder is a multishaft extruder with intermeshing screw shafts.

7. The device as claimed in claim 5, wherein the grooves of the rotating plate(s) are arranged radially and the grooves of the plate that does not rotate concomitantly are arranged to some extent radially and to some extent obliquely.

8. A process comprising extruding plastic compositions utilizing the device as claimed in claim 1.

9. The process as claimed in claim 8, further comprising dispersing gaseous, liquid or pulverulent additives in the plastic compositions utilizing the extruder.

10. The process as claimed in claim 8, wherein the plastic compositions are thermoplastics or elastomers.

11. The process as claimed in claim 10, wherein the thermoplastics comprise a homo- or copolycarbonate or a blend comprising at least one homo- or copolycarbonate.

* * * * *